(12) United States Patent
Scicluna

(10) Patent No.: US 8,764,120 B2
(45) Date of Patent: Jul. 1, 2014

(54) INTERCHANGEABLE WHEEL COVER FOR A WHEEL OF A PIECE OF LUGGAGE OR THE LIKE

(75) Inventor: Paul V. Scicluna, Penndel, PA (US)

(73) Assignee: Tumi, Inc., South Plainfield, NJ (US)

( * ) Notice: Subject to any disclaimer, the term of this patent is extended or adjusted under 35 U.S.C. 154(b) by 363 days.

(21) Appl. No.: 12/798,596

(22) Filed: Apr. 7, 2010

(65) Prior Publication Data

US 2011/0248551 A1 Oct. 13, 2011

(51) Int. Cl.
*B60B 7/04* (2006.01)
*B60B 7/08* (2006.01)

(52) U.S. Cl.
USPC ............. 301/37.26; 301/37.102; 301/100.1; 301/37.42; 301/37.24

(58) Field of Classification Search
USPC ........ 301/37.101, 37.22, 37.23, 37.24, 37.25, 301/37.26, 37.27, 37.102, 37.31, 37.32, 301/37.33, 37.34, 37.35, 37.36, 37.108, 301/37.109, 37.42, 108.1, 108.3
See application file for complete search history.

(56) References Cited

U.S. PATENT DOCUMENTS

| | | | |
|---|---|---|---|
| 1,495,665 A * | 5/1924 | Bigelow et al. | 206/304.1 |
| 3,528,705 A * | 9/1970 | Oldroyd | 301/37.42 |
| 4,295,685 A | 10/1981 | Spisak | |
| 5,058,959 A | 10/1991 | Miles | |
| 5,458,401 A | 10/1995 | Baccman | |
| 5,921,635 A * | 7/1999 | Deliman et al. | 301/111.05 |
| 6,779,852 B2 * | 8/2004 | Van Houten et al. | 301/37.43 |
| 6,945,609 B2 | 9/2005 | Barney | |
| 6,991,299 B2 * | 1/2006 | Hauler | 301/37.43 |
| 7,416,260 B1 * | 8/2008 | Cuevas et al. | 301/37.43 |
| 8,162,406 B2 * | 4/2012 | Heck et al. | 301/37.43 |
| 2003/0178888 A1 * | 9/2003 | Chang | 301/108.3 |
| 2005/0168051 A1 * | 8/2005 | Wang | 301/37.25 |
| 2007/0200421 A1 | 8/2007 | DoVale | |
| 2010/0050376 A1 * | 3/2010 | Tsang | 16/45 |

FOREIGN PATENT DOCUMENTS

CN 201132470 Y * 10/2008
GB 2463032 A * 3/2010

* cited by examiner

Primary Examiner — Kip T Kotter
(74) Attorney, Agent, or Firm — Jon Fallon, Esq.; Michael P. Kochka, Esq.

(57) ABSTRACT

An interchangeable wheel cover for a wheel of a piece of luggage, including a center cap assembly and a trim ring assembly. The center cap assembly interchangeable affixes the trim ring assembly to the wheel of the piece of luggage.

18 Claims, 4 Drawing Sheets

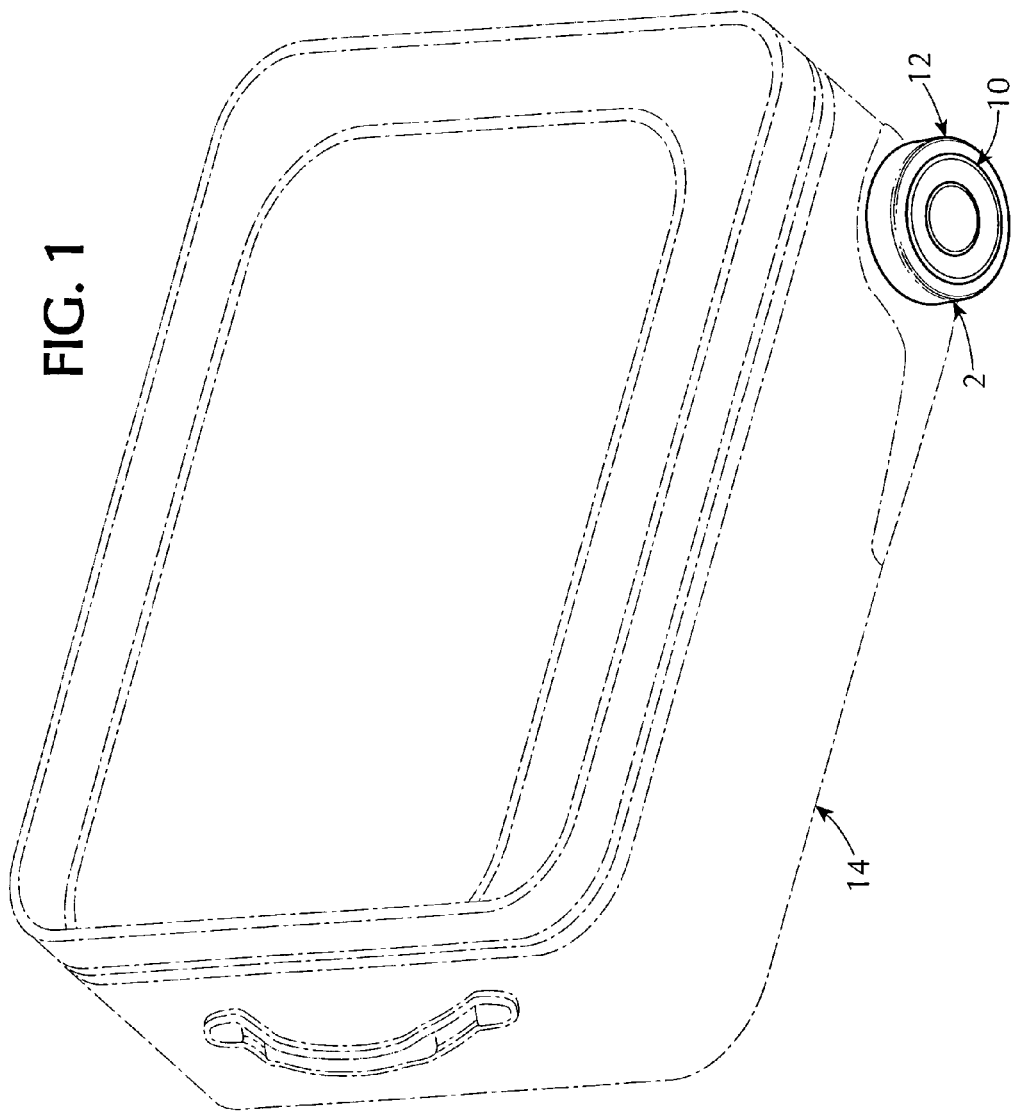

INTERCHANGEABLE WHEEL COVER FOR A WHEEL OF A PIECE OF LUGGAGE OR THE LIKE

1. BACKGROUND OF THE INVENTION

A. Field of the invention

The embodiments of the present invention relate to a wheel of a piece of luggage or the like, and more particularly, the embodiments of the present invention relate to an interchangeable wheel cover for a wheel of a piece of luggage or the like.

B. Description of the Prior Art

Numerous innovations for wheel covers have been provided in the prior art, which will be described below in chronological order to show advancement in the art, and which are incorporated herein by reference thereto. Even though these innovations may be suitable for the individual purposes to which they address, nevertheless, they differ from the present invention in that they do not teach an interchangeable wheel cover for a wheel of a piece of luggage or the like.

(1) U.S. Pat. No. 4,295,685 to Spisak.

U.S. Pat. No. 4,295,685 issued to Spisak on Oct. 20, 1981 in U.S. class 301 and subclass 37 P teaches a wheel trim assembly for vehicle wheels, which has a plastic body member with selected portions covered with a cover member made from thin metal and fastened to the exposed face of the plastic body member so that portions of the wheel trim have a metallic finish and remaining portions have a non-metallic finish.

(2) U.S. Pat. No. 5,058,959 to Miles et al.

U.S. Pat. No. 5,058,959 issued to Miles et al. on Oct. 22, 1991 in U.S. class 301 and subclass 108 TW teaches an identification system for cases with wheels, which includes a label sized to fit within the outer periphery of the circular face of the wheel, and an element for attaching the label to the face of the wheel. Preferably, the attaching system includes adhesives labels for attaching to the outer face of a hubcap on the wheel. Alternatively, the hubcap may be made transparent or may have a transparent portion, and includes releasable barbed attachments for holding the hubcap and the identifying indicia positioned between the transparent hubcap and the circular face of the wheel.

(3) U.S. Pat. No. 5,458,401 to Baccman.

U.S. Pat. No. 5,458,401 issued to Baccman on Oct. 17, 1995 in U.S. class 301 and subclass 37.43 teaches a metal applique configured to conform to the shape of the outer face of a stock vehicle wheel. The face of the applique is finished with a selected surface treatment, such as chrome plate, brushed metal, paint, machining, etc. A stratum including an acrylic adhesive-coated foam core is adhered to the inner face of the applique. The applique is bonded to the outer face of the vehicle wheel after removing a release film to expose the acrylic adhesive. The bond is achieved by registering the applique with the face of the wheel and applying a compressive force.

(4) U.S. Pat. No. 6,945,609 B2 to Barney.

U.S. Pat. No. 6,945,609 B2 issued to Barney on Sep. 20, 2005 in U.S. class 301 and subclass 37.25 teaches a wheel cover apparatus for augmenting a vehicle wheel to provide various aesthetic appearances, while also allowing for relatively easy removal without sacrificing security. A releasable connector can be used to releasably secure the wheel cover to a mounting member. The mounting member can be attached to vehicle-wheel lug-bolts. In order to provide a releasable connection, the connector assembly can include a receiving assembly and an engaging assembly, such as a ball lock mechanism. Further, the wheel cover apparatus can include a bearing that allows the wheel cover to rotate independently of the mounting member. This rotation can be free rotation or weighted, so that the wheel cover remains in substantially the same orientation during travel as when at rest. In this way, designs or images on the wheel cover can be viewed during motion of the vehicle.

(5) United States Patent Application Publication Number US 2007/0200421 A1 to DoVale, Jr. et al.

United States Patent Application Publication Number US 2007/0200421 A1 published to DoVale, Jr. et al. on Aug. 30, 2007 in U.S. class 301 and subclass 37.25 teaches a selectively attachable wheel cover for a motor vehicle, which includes a base member and a display member. The base member is selectively secured to the vehicle rim, and the display member is rotatably mounted relative to the base member, so that it can rotate in relation to the base member, and thus, the vehicle rim. In one aspect, a portion of the display member is sufficiently weighted, so that when the rim rotates—when the vehicle is in motion—the display member remains substantially static.

It is apparent that numerous innovations for wheel covers have been provided in the prior art that are adapted to be used. Furthermore, even though these innovations may be suitable for the specific individual purposes to which they address, however, they would not be suitable for the purposes of the embodiments of the present invention as heretofore described, namely, an interchangeable wheel cover for a wheel of a piece of luggage or the like.

2. SUMMARY OF THE INVENTION

Thus, an object of the embodiments of the present invention is to provide an interchangeable wheel cover for a wheel of a piece of luggage or the like, which avoids the disadvantages of the prior art.

Briefly stated, another object of the embodiments of the present invention is to provide an interchangeable wheel cover for a wheel of a piece of luggage, including a center cap assembly and a trim ring assembly. The center cap assembly interchangeably affixes the trim ring assembly to the wheel of the piece of luggage.

The novel features considered characteristic of the embodiments of the present invention are set forth in the appended claims. The embodiments of the present invention themselves, however, both as to their construction and their method of operation together with additional objects and advantages thereof will be best understood from the following description of the specific embodiments when read and understood in connection with the accompanying figures of the drawing.

3. BRIEF DESCRIPTION OF THE FIGURES OF THE DRAWING

The figures of the drawing are briefly described as follows:

FIG. 1 is a diagrammatic perspective view of the interchangeable wheel cover of the embodiments of the present invention on a wheel of a piece of luggage or the like;

4. LIST OF REFERENCE NUMERALS UTILIZED IN THE FIGURES OF THE DRAWING

Figure 3:
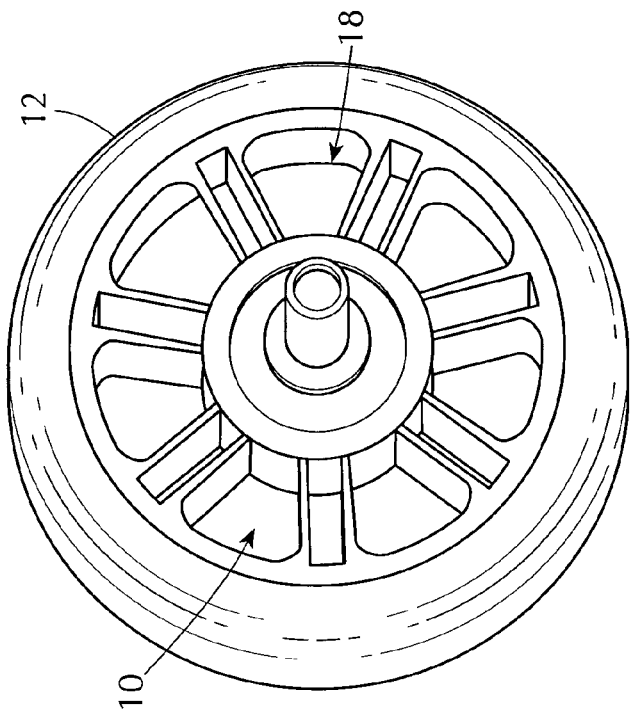
FIG. 3 is a diagrammatic rear perspective view of the interchangeable wheel cover of the embodiments of the present invention taken generally in the direction of ARROW 3 in FIG. 2.

A. General.
10 interchangeable wheel cover of embodiments of present invention for wheel 12 of piece of luggage or like 14
12 wheel of piece of luggage or like 14
14 piece of luggage or like
B. Overall Configuration of Interchangeable Wheel Cover 10.
16 center cap assembly
18 trim ring assembly
C. Specific Configuration of Center Cap Assembly 16 and Trim Ring Assembly 18.
22 hubcap of center cap assembly 16
24 wheel-facing surface of hubcap 22 of center cap assembly 16
26 snap clips of wheel-facing surface 24 of hubcap 22 of center cap assembly 16
28 ring of center cap assembly 16
30 first ring of trim ring assembly 18
32 second ring of trim ring assembly 18
34 base ring of trim ring assembly 18
36 wheel-facing surface of base ring 34 of trim ring assembly 18
38 snap clips of wheel-facing surface 36 of base ring 34 of trim ring assembly 18
D. Specific Configuration of First Ring 30 of Trim Ring Assembly 18.
39 periphery of first ring 30 of trim ring assembly 18
40 peripheral cuff of first ring 30 of trim ring assembly 18
E. Specific Configuration of Second Ring Second Ring 32 of Trim Ring Assembly 18.
42 wheel-facing surface of second ring 32 of trim ring assembly 18
44 pins of wheel-facing surface 42 of second ring 32 of trim ring assembly 18
F. Specific Configuration of Base Ring 34 of Trim Ring Assembly 18.
46 through bores of base ring 34 of trim ring assembly 18
G. Specific Configuration of Wheel 12 of Piece of Luggage or Like 14.
48 hub of wheel 12 of piece of luggage or like 14
50 rim of wheel 12 of piece of luggage or like 14
52 spokes of wheel 12 of piece of luggage or like 14
54 pair of bearings of wheel 12 of piece of luggage or like 14
56 axle of wheel 12 of piece of luggage or like 14
58 widened head of axle 56 of wheel 12 of piece of luggage or like 14

5. DETAILED DESCRIPTION OF THE PREFERRED EMBODIMENTS

A. General.

Referring now to the figures, in which like numerals indicate like parts, and particularly to FIG. 1, which is a diagrammatic perspective view of the interchangeable wheel cover of the embodiments of the present invention on a wheel of a piece of luggage or the like, the interchangeable wheel cover of the embodiments of the present invention is shown generally at 10 for a wheel 12 of a piece of luggage or the like 14.

B. The Overall Configuration of the Interchangeable Wheel Cover 10.

Figure 2:
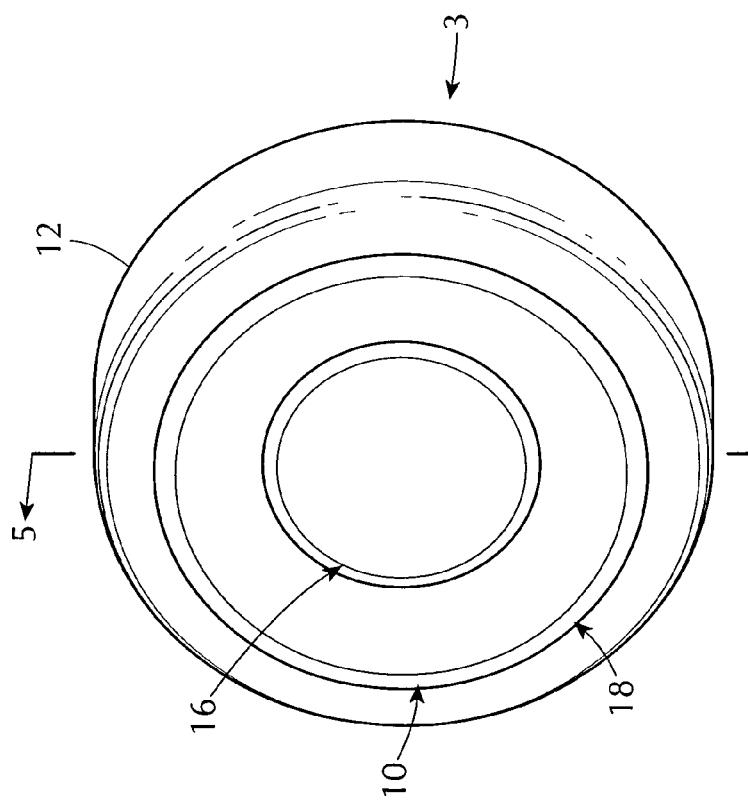
FIG. 2 is an enlarged diagrammatic front perspective view of the interchangeable wheel cover of the embodiments of the present invention identified by ARROW 2 in FIG. 1.

The overall configuration of the interchangeable wheel cover 10 can best be seen in FIGS. 2 and 3, which are, respectively, an enlarged diagrammatic front perspective view of the interchangeable wheel cover of the embodiments of the present invention identified by ARROW 2 in FIG. 1, and a diagrammatic rear perspective view of the interchangeable wheel cover of the embodiments of the present invention taken generally in the direction of ARROW 3 in FIG. 2, and as such, will be discussed with reference thereto.

The interchangeable wheel cover 10 comprises a center cap assembly 16 and a trim ring assembly 18. The center cap assembly 16 interchangeable affixes the trim ring assembly 18 to the wheel 12 of the piece of luggage or the like 14.

C. The Specific Configuration of the Center Cap Assembly 16 and the Trim Ring Assembly 18.

Figure 4:
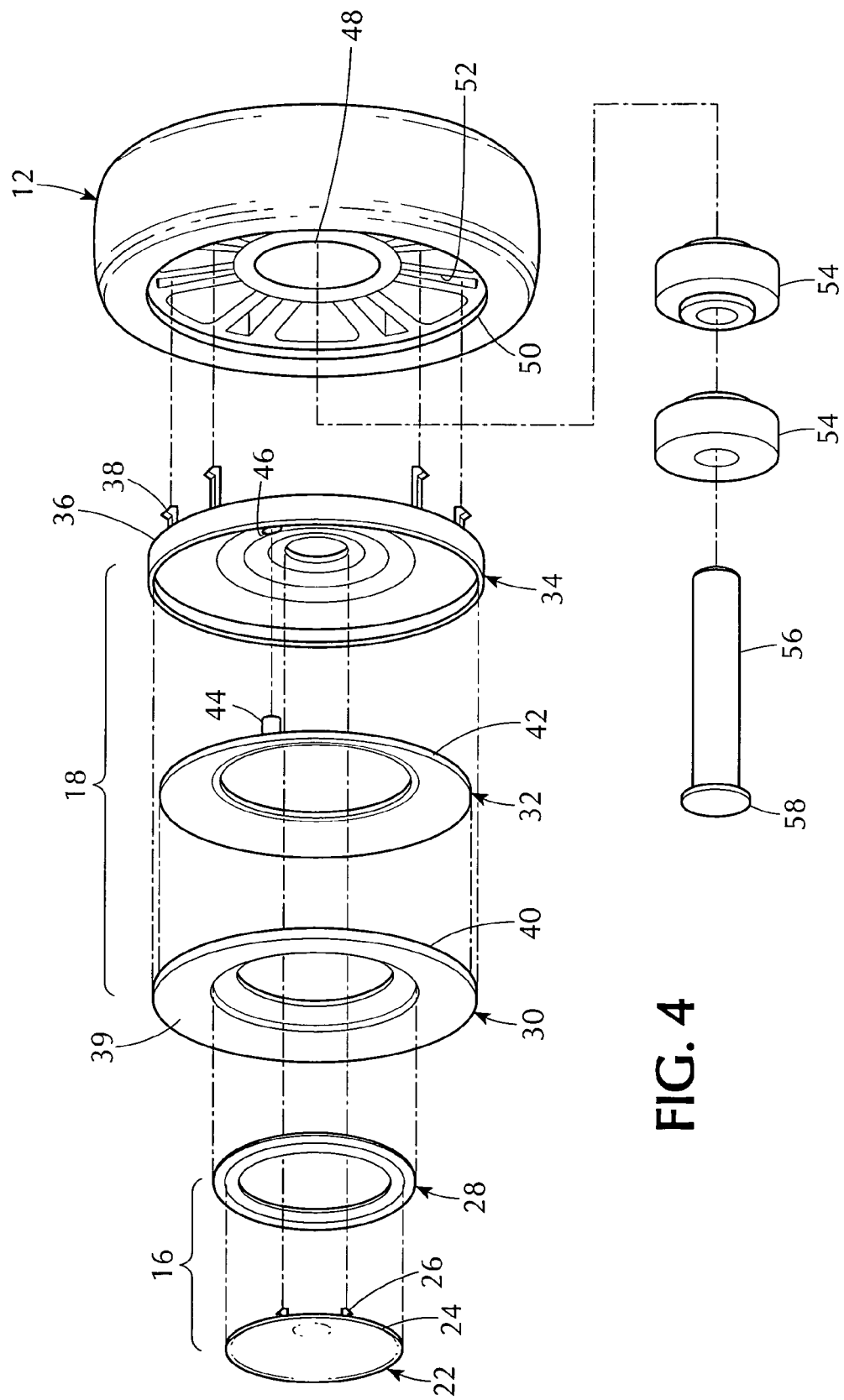
FIG. 4 is an exploded diagrammatic perspective view of the interchangeable wheel cover of the embodiments of the present invention shown in FIG. 2.
Figure 5:
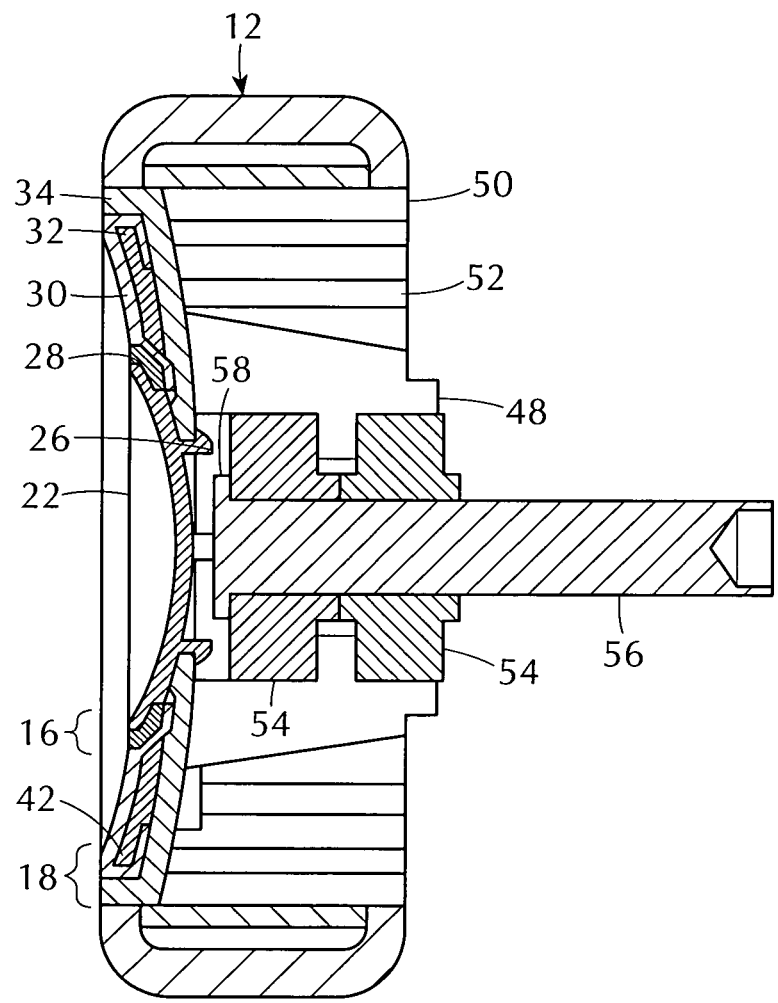
FIG. 5 is a diagrammatic cross sectional view taken along LINE 5-5 in FIG. 2.

The specific configuration of the center cap assembly 16 and the trim ring assembly 18 can best be seen in FIGS. 4 and 5, which are, respectively, an exploded diagrammatic perspective view of the interchangeable wheel cover of the embodiments of the present invention shown in FIG. 2, and a diagrammatic cross sectional view taken along LINE 5-5 in FIG. 2, and as such, will be discussed with reference thereto.

The center cap assembly 16 comprises a hubcap 22. The hubcap 22 of the center cap assembly 16 has a wheel-facing surface 24. The wheel-facing surface 24 of the hubcap 22 of the center cap assembly 16 has snap clips 26 extending axially outwardly therefrom, towards the wheel 12 of the piece of luggage or the like 14.

The center cap assembly 16 further comprises a ring 28. The hubcap 22 of the center cap assembly 16 sits in, rests concentrically on, and is outboard of, the ring 28 of the center cap assembly 16, with the snap clips 26 of the hubcap 22 of the center cap assembly 16 extending axially through the ring 28 of the center cap assembly 16, towards the wheel 12 of the piece of luggage or the like 14.

The trim ring assembly 18 comprises a first ring 30. The first ring 30 of the trim ring assembly 18 has the ring 28 of the center cap assembly 16 sitting concentrically therein, and sandwiched between the first ring 30 of the trim ring assembly 18 and the hubcap 22 of the center cap assembly 16, with the snap clips 26 of the hubcap 22 of the center cap assembly 16 extending axially through the first ring 30 of the trim ring assembly 18, towards the wheel 12 of the piece of luggage or the like 14.

The trim ring assembly 18 further comprises a second ring 32. The second ring 32 of the trim ring assembly 18 sits concentrically in, and inboard of, the first ring 30 of the trim ring assembly 18, with the snap clips 26 of the hubcap 22 of the center cap assembly 16 extending axially through the second ring 32 of the trim ring assembly 18, towards the wheel 12 of the piece of luggage or the like 14.

The trim ring assembly 18 further comprises a base ring 34. The base ring 34 of the trim ring assembly 18 has the second ring 32 of the trim ring assembly 18 sitting concentrically therein, and sandwiched between the base ring 34 of the trim ring assembly 18 and the first ring 30 of the trim ring assembly 18, with the snap clips 26 of the hubcap 22 of the center cap assembly 16 extending axially into, and replaceably engaging in, the base ring 34 of the trim ring assembly 18, to thereby capture the ring 28 of the center cap assembly 16, the first ring 30 of the trim ring assembly 18, and the second ring 32 of the trim ring assembly 18 between the hubcap 22 of the center cap assembly 16 and the base ring 34 of the trim ring assembly 18, to thereby form the interchangeable wheel cover 10.

The base ring 34 of the trim ring assembly 18 has a wheel-facing surface 36. The wheel-facing surface 36 of the base ring 34 of the trim ring assembly 18 has snap clips 38 extending axially therefrom, towards, and replaceably engaging, the wheel 12 of the piece of luggage or the like 14, to thereby interchangeably attach the interchangeable wheel cover 10 to the wheel 12 of the piece of luggage or the like 14.

D. The Specific Configuration of the Hubcap 22 of the Center Cap Assembly 16.

The hubcap 22 of the center cap assembly 16 is disk-shaped.

E. The Specific Configuration of the First Ring 30 of the Trim Ring Assembly 18.

The first ring 30 of the trim ring assembly 18 has a periphery 39. The periphery 39 of the first ring 30 of the trim ring assembly 18 has a wheel-facing surface that bends towards itself so as to form a peripheral cuff 40. The peripheral cuff 40 of the first ring 30 of the trim ring assembly 18 captures the second ring 32 of the trim ring assembly 18 against the first ring 30 of the trim ring assembly 18 so as to allow the second ring 32 of the trim ring assembly 18 to function as a rigid core for the first ring 30 of the trim ring assembly 18.

F. The Specific Configuration of the Second Ring 32 of the Trim Ring Assembly 18.

The second ring 32 of the trim ring assembly 18 has a wheel-facing surface 42. The wheel-facing surface 42 of the second ring 32 of the trim ring assembly 18 has pins 44 extending axially outwardly therefrom, towards the base ring 34 of the trim ring assembly 18.

G. The Specific Configuration of the Base Ring 34 of the Trim Ring Assembly 18.

The base ring 34 of the trim ring assembly 18 has through bores 46. The through bores 46 of the base ring 34 of the trim ring assembly 18 receive the pins 44 of the wheel-facing surface 42 of the second ring 32 of the trim ring assembly 18, respectively, to prevent rotation of the second ring 32 of the trim ring assembly 18 relative to the base ring 34 of the trim ring assembly 18.

H. The Specific Configuration of the Wheel 12 of the Piece of Luggage or the Like 14.

The wheel 12 of the piece of luggage or the like 14 comprises a hub 48, a rim 50, and spokes 52. The spokes 52 of the wheel 12 of the piece of luggage or the like 14 extend radially outwardly from the hub 28 of the wheel 12 of the piece of luggage or the like 14 to the rim 50 of the wheel 12 of the piece of luggage or the like 14.

The snap clips 38 of the base ring 34 of the trim ring assembly 18 are releasably captured between adjacent pairs of spokes 52 of the wheel 12 of the piece of luggage or the like 14 so as to prevent rotation of the interchangeable wheel cover 10 relative to the wheel 12 of the piece of luggage or the like 14.

The wheel 12 of the piece of luggage or the like 14 further comprises a pair of bearings 54. The pair of bearings 54 of the wheel 12 of the piece of luggage or the like 14 are, preferably, pin or roller bearings, and sit in the hub 48 of the wheel 12 of the piece of luggage or the like 14, by press-fitting or the like.

The wheel 12 of the piece of luggage or the like 14 further comprises an axle 56. The axle 56 of the wheel 12 of the piece of luggage or the like 14 extends into the pair of bearings 54 of the wheel 12 of the piece of luggage or the like 14 and into the piece of luggage or the like 14.

The axle 56 of the wheel 12 of the piece of luggage or the like 14 has a widened head 58. The widened head 58 of the axle 56 of the wheel 12 of the piece of luggage or the like 14 is captured between an innermost bearing 54 of the wheel 12 of the piece of luggage or the like 14 and the wheel-facing surface 24 of the hubcap 22 of the center cap assembly 16, to thereby prevent the axle 56 of the wheel 12 of the piece of luggage or the like 14 from passing completely through the pair of bearings 54 of the wheel 12 of the piece of luggage or the like 14.

I. The Materials of the Hubcap 22 of the Center Cap Assembly 16, the Ring 28 of the center cap assembly 16, the second ring 32 of the trim ring assembly 18, the Base Ring 34 of the Trim Ring Assembly 18, the First Ring 30 of the Trim Ring Assembly 18, the Wheel 12 of the Piece of Luggage or the Like 14, the Axle 56 of the Wheel 12 of the Piece of Luggage or the Like 14, and the Pair of Bearings 54 of the Wheel 12 of the Piece of Luggage or the Like 14.

The hubcap 22 of the center cap assembly 16, the ring 28 of the center cap assembly 16, the second ring 32 of the trim ring assembly 18, and the base ring 34 of the trim ring assembly 18 are, preferably, made from ABS plastic so as to be rigid.

The first ring 30 of the trim ring assembly 18 is, preferably, made from leather so as to be flexible.

The wheel 12 of the piece of luggage or the like 14 is, preferably, made from polyurethane so as to be rigid.

The axle 56 of the wheel 12 of the piece of luggage or the like 14 is, preferably, made from steel so as to be rigid.

The pair of bearings 54 of the wheel 12 of the piece of luggage or the like 14 are, preferably, made from carbon steel so as to minimize frictional damage to the axle 56 of the wheel 12 of the piece of luggage or the like 14.

J. Impressions.

It will be understood that each of the elements described above or two or more together may also find a useful application in other types of constructions differing from the types described above.

While the embodiments of the present invention have been illustrated and described as embodied in an interchangeable wheel cover for a wheel of a piece of luggage or the like, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. A wheel cover for a wheel of a piece of luggage, comprising:
   a center cap assembly comprising:
      a ring; and
      a hubcap adapted to be disposed concentrically on the ring and outboard of the ring, the hubcap having a wheel-facing surface comprising snap clips extending axially therefrom; and
   a trim ring assembly comprising:
      a first ring adapted to allow the ring of the center cap assembly to sit concentrically therein outboard of the first ring, and adapted to allow a second ring to sit concentrically therein inboard of the first ring; and
      the second ring adapted to sit concentrically in the first ring inboard of the first ring; and
   wherein the snap clips are adapted to extend axially through the ring of the center cap assembly, through the first ring of the trim ring assembly, and through the second ring of the trim ring assembly facing toward the wheel of the piece of luggage.

2. The wheel cover of claim 1, wherein the trim ring assembly further comprises a base ring.

3. The wheel cover of claim 2, wherein the base ring is adapted to allow the second ring of the trim ring assembly to sit concentrically therein;
   wherein the second ring of the trim ring assembly is adapted to be sandwiched between the base ring and the first ring of the trim ring assembly;
   wherein the snap clips are adapted to extend axially into the base ring; and
   wherein the snap clips are adapted to replaceably engage in the base ring, to thereby capture the ring of the center cap assembly, the first ring of the trim ring assembly, and the second ring of the trim ring assembly between the hubcap and the base ring, to thereby form the wheel cover.

4. The wheel cover of claim 3, wherein the base ring has a wheel-facing surface;
   wherein the wheel-facing surface of the base ring has snap clips extending axially therefrom;
   wherein the snap clips of the wheel-facing surface of the base ring face towards the wheel of the piece of luggage; and
   wherein the snap clips of the wheel-facing surface of the base ring are adapted to replaceably engage the wheel of the piece of luggage, to thereby replaceably attach the wheel cover to the wheel of the piece of luggage.

5. The wheel cover of claim 2, wherein said second ring of said trim ring assembly has a wheel-facing surface;
   wherein said wheel-facing surface of said second ring of said trim ring assembly has pins;
   wherein said pins of said wheel-facing surface of said second ring of said trim ring assembly extend axially therefrom; and
   wherein said pins of said wheel-facing surface of said second ring of said trim ring assembly face towards said base ring of said trim ring assembly.

6. The wheel cover of claim 5, wherein said base ring of said trim ring assembly has through bores; and
   wherein said through bores of said base ring of said trim ring assembly receive said pins of said wheel-facing surface of said second ring of said trim ring assembly, respectively, to prevent rotation of said second ring of said trim ring assembly relative to said base ring of said trim ring assembly.

7. The wheel cover of claim 2, wherein said hubcap of said center cap assembly, said ring of said center cap assembly, said second ring of said trim ring assembly, and said base ring of said trim ring assembly are made from ABS plastic so as to be rigid.

8. The wheel cover of claim 1, wherein the first ring of the trim ring assembly has a periphery;
   wherein the periphery has a wheel-facing surface;
   wherein the wheel-facing surface of the periphery is adapted to bend toward itself so as to form a peripheral cuff; and
   wherein the peripheral cuff is adapted to capture the second ring of the trim ring assembly against the first ring of the trim ring assembly so as to allow the second ring of the trim ring assembly to function as a rigid core for the first ring of the trim ring assembly.

9. The wheel cover of claim 1, wherein the wheel of the piece of luggage comprises a hub;
   wherein the wheel of the piece of luggage comprises a rim;
   wherein the wheel of the piece of luggage comprises spokes; and
   wherein the spokes of the wheel of the piece of luggage extend radially outwardly from the hub of the wheel of the piece of luggage to the rim of the wheel of the piece of luggage.

10. The wheel cover of claim 9, wherein the wheel of the piece of luggage comprises a pair of bearings; and
    wherein the pair of bearings of the wheel of the piece of luggage sit in the hub of the wheel of the piece of luggage.

11. The wheel cover of claim 10, wherein the pair of bearings of the wheel of the piece of luggage are one of pin bearings and roller bearings.

12. The wheel cover of claim 10, wherein the wheel of the piece of luggage comprises an axle; and
    wherein the axle of the wheel of the piece of luggage extends into the pair of bearings of the wheel of the piece of luggage and into the piece of luggage.

13. The wheel cover of claim 12, wherein the axle of the wheel of the piece of luggage has a widened head; and
    wherein the widened head of the axle of the wheel of the piece of luggage is captured between an innermost bearing of the wheel of the piece of luggage and said wheel-facing surface of said hubcap of said center cap assembly, to thereby prevent the axle of the wheel of the piece of luggage from passing completely through the pair of bearings of the wheel of the piece of luggage.

14. The wheel cover of claim 12, wherein the axle of the wheel of the piece of luggage is made from steel so as to be rigid.

15. The wheel cover of claim 12, wherein the pair of bearings of the wheel of the piece of luggage are made from carbon steel so as to minimize frictional damage to the axle of the wheel of the piece of luggage.

16. The wheel cover of claim 1, wherein the first ring of the trim ring assembly is made from leather so as to be flexible.

17. The wheel cover of claim 1, wherein the wheel of the piece of luggage is made from polyurethane so as to be rigid.

18. The wheel cover of claim 1, wherein the hubcap of the center cap assembly is disk-shaped.

* * * * *